UNITED STATES PATENT OFFICE.

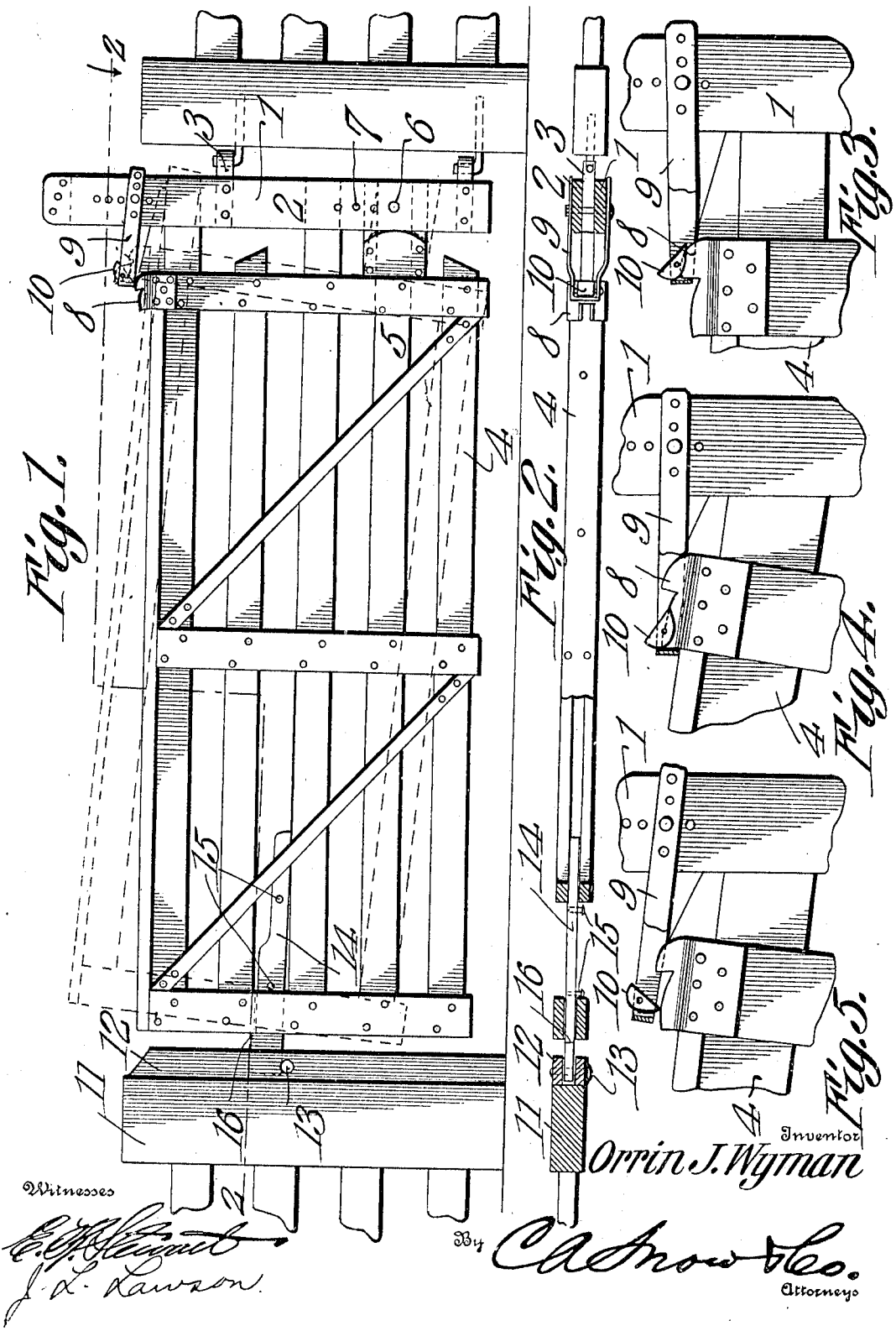

ORRIN J. WYMAN, OF CLYDE, OHIO.

FARM-GATE.

950,526.  Specification of Letters Patent.  Patented Mar. 1, 1910.

Application filed October 12, 1909. Serial No. 522,315.

*To all whom it may concern:*

Be it known that I, ORRIN J. WYMAN, a citizen of the United States, residing at Clyde, in the county of Sandusky and State of Ohio, have invented a new and useful Farm-Gate, of which the following is a specification.

This invention has relation to gates and it consists in the novel construction and arrangement of its parts as hereinafter shown and described.

The object of the present invention is to provide a gate structure adapted to be hingedly mounted upon a gate post and including an upright member carrying the hinge members to which the gate panel is pivotally attached and with relation to which the said gate panel may swing in a vertical direction. A catch mechanism is carried by the said upright and is arranged to engage the gate panel so as to hold the same at a desired angle with relation to the upright. The gate panel is provided with a slidable bar adapted to engage keepers provided upon a keeper post and the said bar is provided with a locking shoulder for engagement with the end of the panel. By this arrangement it will be seen that a gate structure is effected in which the free end of the gate panel may be held at a desired distance from the surface of the ground so that the space between the gate posts may afford passage for small animals while at the same time said panel may serve as a barrier for larger animals. At the same time a device is provided for positively holding the gate panel in a closed position. Also the parts are so arranged that the gate panel may be readily adjusted from an inclined position as indicated into a horizontal position. This may be accomplished by an operator standing at the free end of the gate panel and manipulating the same in the manner as will be explained hereinafter.

In the accompanying drawings:—Figure 1 is a side elevation of the gate. Fig. 2 is a horizontal sectional view of the same cut on the line 2—2 of Fig. 1. Fig. 3 is a detail side elevation of the catch between the upright and the gate panel showing parts thereof in section. Fig. 4 is a similar view illustrating the catch holding the panel at an incline with relation to the uprights. Fig. 5 is a similar view illustrating the manner in which the catch may be caused to disengage the panel.

The gate structure includes an upright 1 made up of spaced parallel bars 2, between which are secured hinge members 3. A gate panel 4 is provided with a bar 5 having an end which projects beyond the end of the panel proper and which is mounted upon a pivot bolt 6 which passes transversely through the upright 1. The said upright 1 is provided with a series of bolt perforations 7 whereby the panel 4 may be positioned at different elevations along the upright 1. The panel 4 is provided at its upper edge and at the end thereof adjacent the upright 1 with a ratchet plate 8. A bail 9 is pivotally and adjustably mounted upon the upright 1 and is adapted to engage the ratchet of the plate 8. A fender 10 made preferably with downturned side portions is pivotally mounted at the intermediate portion of the bail 9 and is adapted to swing in a manner hereinafter to be described to cause the edge of the intermediate portion of the bail 9 to escape the ratchet as the said intermediate portion passes over the ratchet of the plate 8. The distance from the pivot point of the fender to its ends is greater than the distance from the pivot point of the fender to the end of the bail. A gate post 11 is provided with parallel spaced keeper bars 12 through which a pin 13 passes transversely. A latch bar 14 is slidably mounted at the free end of the panel 4 and is provided with transversely disposed pins 15 which are adapted to limit the sliding movement of the said bar. The said latch bar 14 is provided at its upper edge with a shoulder 16 and when the lower edge of the said latch bar 14 engages the upper side of the pin 13, the said shoulder 16 is projected in an upward direction and is adapted to abut against the end of one of the horizontal bars of the panel 4. When the panel 4 is at a right angle with relation to the upright 1 or in a horizontal position the intermediate portion of the bail 9 is in engagement with the outermost ratchet of the plate 8 as illustrated in Fig. 3 of the drawings. As will be seen in the said figure the fender 10 then lies over the outer upper edge of the said plate 8.

When it is desired that the panel 4 should assume a position at an angle to the upright 1, the free end of the said panel is elevated as indicated in dotted lines in Fig. 1 and the intermediate portion of the bail 9 engages the innermost ratchet of the plate 8 in the manner as illustrated in Fig. 4. Thus the panel 4 will be held so that its free end is considerably above the surface of the ground and thus room may be provided below the edge of the said panel to permit small animals to pass through the gateway while the said panel serves as a barrier for larger animals. In either position, the panel 4 may be secured with relation to the post 11 by projecting the latch bar 14 into the space between the keeper bars 12. When however it is desired to securely fasten the panel 4 in a closed position when the said panel is horizontal, the end of the latch bar 14 is projected between the keeper bars 12 and the free edge of the panel 4 is permitted to descend until one of the horizontal bars of the panel comes in contact with the shoulder 16 as shown in Fig. 1. Thus it will be seen that before the panel can be swung to an open position it is necessary to raise the free end thereof sufficiently to permit the upper edge of the shoulder 16 to descend below the lower edge of that horizontal bar of the panel 4 with which it is in engagement. When this is done, the latch bar 14 may be moved longitudinally within the panel 4 when the gate may be swung to an open position.

An operator may stand at the free end of the panel 4 and by raising and lowering the same and manipulating the parts can cause the intermediate portion of the latch bail 9 to engage any one of the ratchets of the plate 8. For instance presuming that the catch bail 9 is in the position as illustrated in Fig. 3 and it is desired to raise and support the panel 4 at an incline with relation to the upright 1. This can be done by raising the free end of the said panel to such an extent as to cause the intermediate portion of the catch bar 9 to move beyond the innermost ratchet of the plate 8 then by permitting the free end of the panel 4 to descend the parts will assume the positions as illustrated in Fig. 4 of the drawings.

When it is desired to move the parts from the position illustrated in Fig. 4 to that shown in Fig. 3, an operator raises the free end of the panel 4 to such an extent that the pivoted fender 10 is carried beyond the innermost ratchet of the plate 8 and then by lowering the free end of the panel 4 the outer end of the said fender comes in contact with the innermost ratchet and the fender turns upon its pivot in a manner as illustrated in Fig. 5 and elevates the catch bail 9 and lifts the same over the ratchet of the plate 8. When the free end of the panel 4 has been lowered to such an extent that the edge of the fender 10 is carried beyond the outermost ratchet 8, the free end of the panel 4 is again elevated and the said fender is again turned upon its pivot so that the intermediate portion of the catch bail 9 may be moved into engagement with either of the ratchets carried by the plate 8.

Having described my invention, what I claim as new and desire to secure by Letters Patent is:

1. A gate structure comprising an upright, a panel pivoted to the upright for vertical swinging movement, a series of ratchets carried by the panel, a catch bail pivoted to the upright and adapted to engage the ratchets and a fender pivoted to the catch bail and adapted to swing between the free end of the catch bail and the ratchets.

2. A gate structure comprising an upright, a panel pivoted to the upright for vertical swinging movement, a series of ratchets carried by the panel, a catch bail pivoted to the upright and adapted to engage the ratchets and a fender pivoted to the catch bail and adapted to swing with relation to the bail so that its opposite end portions may engage the end of the bail.

3. A gate structure comprising a support, a panel pivoted thereto for vertical swinging movement, a series of ratchets carried by the panel, a catch pivoted to the support and adapted to engage the ratchets and a fender pivoted to the catch and adapted to be swung upon its pivot by contact with the ratchets when the gate is swung vertically.

In testimony that I claim the foregoing as my own, I have hereto affixed my signature in the presence of two witnesses.

ORRIN J. WYMAN.

Witnesses:
  M. W. HUNT,
  JOSEPH E. HUNT.